Jan. 12, 1971  R. J. GARGRAVE ET AL  3,554,060
DIE PLATES
Filed Aug. 11, 1967  2 Sheets-Sheet 2
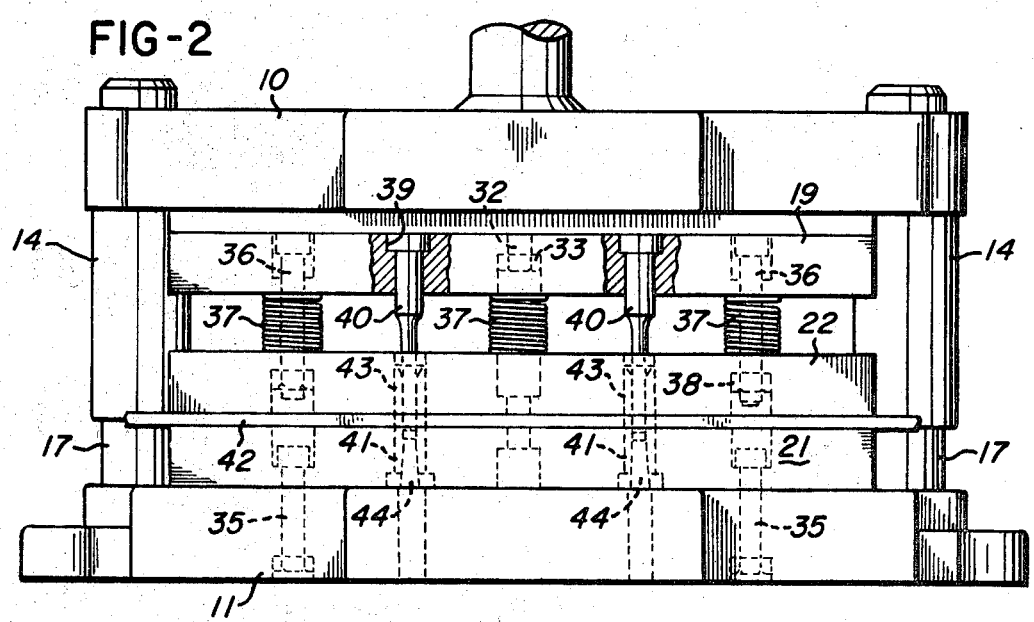
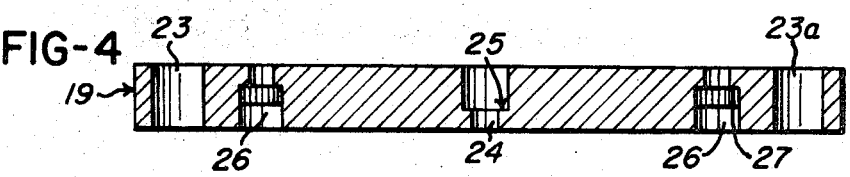
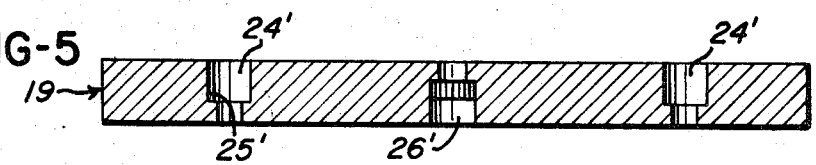
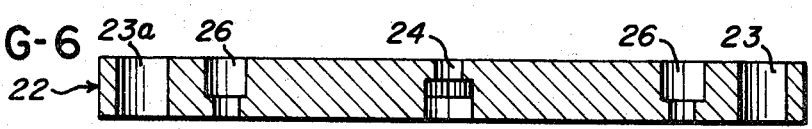
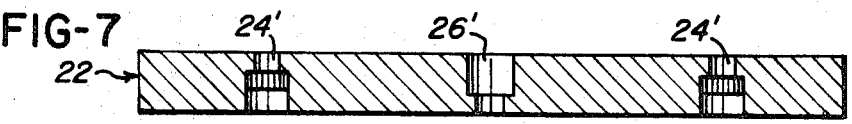
INVENTORS
ROBERT J. GARGRAVE
ALLAN E. RANDOLPH, SR.
LUDOMIL A. HOLIGA
BY *Jerome P. Bloom*
ATTORNEY United States Patent Office 3,554,060
Patented Jan. 12, 1971

3,554,060
DIE PLATES
Robert J. Gargrave, Dayton, Ohio, Allan E. Randolph, Sr., Livonia, Mich., and Ludomil A. Holiga, Dayton, Ohio, assignors to Dayton Perforators, Inc., Dayton, Ohio, a corporation of Ohio
Filed Aug. 11, 1967, Ser. No. 660,134
Int. Cl. B21k 5/20
U.S. Cl. 76—107
13 Claims

ABSTRACT OF THE DISCLOSURE

A unique stock die plate formed with staggered hold-down openings arranged in a truss pattern to provide the plate with maximum tooling area and with increased strength and rigidity on mount thereof to a die shoe, said plate also featuring key apertures affording both datum control enabling a fast and accurate location of holes and various tool components which may subsequently be machined in or attached to the die plate and means for a radial lock of similar stacked plates, said plate, as described, being so designed that a plurality thereof provides an improved die assembly the components of which may be readily interchanged or substituted for by like plates.

---

This invention relates, primarily, to a new and novel die plate which may be readily adapted for interchangeable use in a great variety of applications. It provides a basic stock item with uniquely positioned hold-down openings insuring a true reference plane for mounted tools. It also includes unique datum control and alignment openings positioned to peripherally define with said hold-down openings a large tooling area which may be precisely and quickly marked and machined to accommodate the mount thereto or interfit therewith of selected cutting elements. The datum control and alignment openings are such to insure that a plurality of said plates may be precisely referenced and radially locked to achieve a precision die assembly the components of which may be simultaneously bored and reamed to insure not only an accurate mount but precision movement and function of the mounted tools.

Furthermore, an improved and economically produced die or like assembly results featuring stock parts which are interchangeable per se and with like parts.

Die assemblies as here contemplated customarily comprise a lower die plate, an upper or overlying die plate serving as a holder for punches or like cutting tools, and, where circumstances so require, an intermediate stripper plate. The latter provides a hold-down of work while the tools enter and are withdrawn therefrom by a reciprocating action of their holder. It is important in die assemblies as here described that its respective plate elements be aligned with one another and, particularly, that the interfitting parts of the die plates and their related tools be precisely aligned. This is essential to avoid undue and rapid wear of the die plates and their mounted tools and to insure accurate and clean cutting of the products on which the assembly operates. Nevertheless, this has proven quite difficult to economically and quickly achieve using stock die blanks.

Conventionally, die plates are custom designed, in their entirety, for each special application. Each plate of an assembly is handled as an individual component. Hold-down and tool locations must be carefully marked in the holder plate and the tool interfitting and hold down openings similarly marked and formed in the opposed die plate. Matching openings must also be carefully marked and achieved in the stripper plate, where utilized. With this involved and time consuming procedure, precise matching of interrelated parts is a tedious matter and very difficult to achieve. Moreover, the procedure is costly and affords ample opportunity for misalignment of parts. It is quite common for inaccuracies to occur which result eventually in an inordinate amount of tool and plate wear and poorly fabricated end produces. Some difficulties have also been found to exist in maintaining a firm and rigid connection of prior art die plates to their related die shoes and establishing a true reference plane, particularly for the tools mounted in holder plates. Moreover, in the prior art practice, if one plate of an assembly breaks or is damaged, it is frequently impractical to replace it. It usually results in a need for complete replacement of the entire assembly in order to get satisfactorily related parts.

The present invention affords a simple solution to the above mentioned problems. As above generally described, it provides a basic stock die element which may be readily applied for use as either an upper or a lower die plate or even a stripper plate. It is one so designed it can be readily modified to suit an extremely wide range of applications. In addition to the foregoing, the plate element of the invention is further characterized by improved strength characteristics. In mount thereof to a die shoe it affords an optimal tooling area which is most rigidly supported and, in the process, affords a true reference plane. It features datum control means together with alignment means enabling a fast and accurate marking of desired tool locations and a common and simultaneous machining of several similar stock plates in a manner to quickly achieve a die assembly and economically provide a precision fit with positive alignment of the interrelated parts.

It is a primary object of the present invention to provide die plates and die assemblies which may be more economically fabricated, more efficient and satisfactory in use, and adaptable to a wide variety of applications.

It is a further object of the invention to provide for means enabling a more readily achieved die assembly the parts of which have a precision fit.

Another object of the invention is to provide a die plate so contrived to produce a basic stock item which may quickly and easily be converted to fit a particular use, a plurality of which may be used to form a die assembly the components of which are readily interchangeable.

An additional object of the invention is to provide an improved die plate which can be more securely mounted to a die shoe.

Another object of the invention is to provide a die plate affording maximum tooling area featuring unique basic hold-down and alignment openings.

An additional object of the invention is to provide a die plate having machined therein an improved pattern of hold-down locations affording a firm and more rigid support for its tooling area without impressing thereon undesirable stress patterns.

Another object of the invention is to provide a basic stock die plate broadly to introduce the concept of aligning similar plates to achieve a die or like set utilizing a master and a slave opening in each plate, the master openings commonly receiving a tight fitting round dowel pin and the slave openings a relieved pin, the latter functioning to radially lock the die plates in a manner to accommodate for extremes in tolerance of said openings without jeopardizing the precision mount of said plates or full utilization of their tooling area.

A further object of the invention is to provide a unique stock die plate featuring datum control and alignment openings enabling a plurality thereof to be applied to form a die assembly, the components of which may be precisely referenced and radially locked and simultaneously machined within their tooling area to insure a precision mount and function of the mounted tools and their interfitting parts.

An additional object of the invention is to provide a die plate assembly comprised of basically like plates including apertures accommodating a pair of holding pins which precisely relate the plates, the one pin being a boss pin having a precision fit and the other being a slave pin relieved to compensate for tolerance discrepancies in the apertures, the one pin dually functioning for datum control in reference to the tooling area of said plates.

Another object of the invention is to provide die plates and an assembly thereof possessing the advantageous structural features, the inherent meritorious characteristics and the means and mode of use herein described.

With the above and other incidental objects in view, as will more fully appear in the specification, the invention intended to be protected by Letters Patent consists of the features of construction, the parts and combinations hereof, and the mode of operation as hereinafter described or illustrated in the accompanying drawings, or their equivalents.

Referring to the accompanying drawing wherein is shown one but obviously not necessarily the only form of embodiment of the invention, FIG. 1 is an exploded perspective view of a die assembly in accordance with a preferred embodiment of the invention, the assembly being shown in conjunction with mounting shoes and the tooling area of each die plate being left blank for clarity of disclosure;

FIG. 2 is a front elevation of a die assembly according to FIG. 1 equipped in part with punch tools and shown in conjunction with and applied to a work piece;

FIG. 3 is a plan view of a stock die plate in accordance with the invention such as used in effecting the assembly illustrated in FIG. 1;

FIG. 4 is a cross-sectional view taken on line 4—4 of FIG. 1;

FIG. 5 is a cross-sectional view taken on line 5—5 of FIG. 1;

FIG. 6 is a cross-sectional view taken on line 6—6 of FIG. 1;

FIG. 7 is a cross-sectional view taken on line 7—7 of FIG. 1;

FIG. 8 is a segmentary plan view showing datum control and position control pins as installed in the tool holding plates 19 and 21 of FIG. 1;

FIG. 9 is a generally schematic view of the die assembly of FIG. 1 showing alignment, punch and stripper control components;

FIG. 10 is a fragmentary detail view showing a modification of the stock die plate affording a slip-fit connection of the pin for achieving radial control of an assembly of the die plate; and FIG. 11 is an alternate modification of the die plate.

Like parts are indicated by similar characters of reference throughout the several views.

Referring to the drawings, FIG. 1 illustrates a die assembly in accordance with the invention the components of which respectively mount to and between opposed relatively reciprocable die shoes 10 and 11. As illustrated, both shoes are relatively heavy generally rectangular plate structures. The upper shoe 10 has laterally projected integrally formed ears 12 and 13 at what might be considered the lateral extremities of its rearmost edge. Each ear has a centrally located aperture defined by an integrally connected relatively dependent tube section 14. In this instance the shoe 10 is contemplated as being vertically reciprocable in reference to the opposed relatively fixed lower shoe 11. The respective extremities of the rear edge of the shoe 11 are similarly formed with centrally apertured ears 15 and 16. The latter position respectively in an underlying vertical alignment with an ear 12 or 13. The ears 15 and 16 respectively accommodate the lower extremity of a vertical post 17 adapted to project through and bear in the overlying tubular projection 14 and the aligned aperture in an ear 12 or 13, as the case may be. In this manner one provides guides for the vertical reciprocation of the shoe 10. It is to be understood, of course, that the shoe 11 is suitably fixed in a press or like bed while the shoe 10 is suitably attached by means of a central projection 18 to the head of a reciprocating ram device (not shown).

As seen in FIG. 1 of the drawings, the invention die assembly there illustrated consists of an upper die retaining or holding plate 19, a lower die plate 21, and, interconnected with the die plate 19, an intermediately disposed stripper plate 22. As shown, each of the plates has a generally rectangular configuration and the plates dispose in a respectively superposed vertically aligned relation. Diverting from the description of the assembly for the moment, noting FIG. 3 of the drawings, in accordance with the invention the basic stock die plate 19 has several preformed openings. These openings are arranged in two relatively parallel lines, one adjacent to and spaced from the front edge of the plate and the other adjacent and spaced forwardly of its rear edge. Intermediate these lines, there remains a substantial tooling area.

Considering the line of openings adjacent the rear edge of the plate 19, the relatively remote openings 23 and 23a are identically formed to provide for datum and position control in a manner to be further described. The central opening defines a vertical passage 24, the plate being counterbored at its upper surface (FIG. 4) to provide an expansion of this passage the inner limit of which is defined by an annular shoulder 25. Spaced intermediately of the opening 24 and each of the respective openings 23 and 23a is a further opening forming a passage 26. The passage 26 is counterbored at the undersurface of the plate 19 to provide an expansion thereof and form thereby a downwardly facing shoulder 27.

The line of openings at the front edge of plate 19 includes a central opening defining a passage 26' (FIG. 5) having a form identical to that of the passage 26. Spaced immediately outward to either side of the passage 26' are openings 24' each of which has a form identical to that of the passage 24.

The lower die plate 21 has a form identical with that of the plate 19 and is oriented similar thereto.

While not necessarily so limited, the stripper plate 22 is again the identical stock die plate. But here the plate 22 is flipped about its central fore and aft axis to invert its apertures, in respect to the counterbored portions.

In the illustrated use of this stripper plate there are only three openings in the rear line which are used. These include the remote openings 23 and 23a adjacent the corners of the plate and the central opening 24. Also, two openings in the front line are used. These are the inverted openings which are identified by the numeral 24'.

It may be seen from the preceding description that in the example shown to illustrate the versatility of the invention the plates 19, 21 and 22 are basically identical in character though differently disposed. The stripper plate 22 may be formed to omit the openings 26 and 26' but this would require the stocking of an additional plate. In any event, the additional openings do not in any way affect the most efficient use and disposition of the invention die plate as a stripper plate and in fact affords optimal mounting methods.

Referring to the plate 19, for example, the plate openings 23 and 23a are precision dimensioned to provide important datum and alignment control. Lines perpendicular to one another passing through the axis of opening 23 provide references for simplified horizontal and vertical measurements (X and Y coordinates) to pinpoint tool locations within the plate tooling area. Any plate can have its tooling area quickly and individually marked in this manner. In the case of an assembly such as shown, however, only the plate 19 need be marked as the invention contemplates a simultaneous precision boring of the stacked die plates. Thus, the markings having been effected in the tooling area of plate 19, the plates 21 and 22 may be stacked thereunder. On aligning the respective openings 23 and 23a in the rear lefthand corners of the plates, as seen in FIG. 1, the stacked plates may receive therein a precision fit alignment pin 28. Similarly, the openings 23a, 23 and 23a at the rear righthand corners of the plate may be generally aligned to receive a diamond type pin 29 as seen in FIG. 8 of the drawings. The diamond contour of pin 29 provides a relief of its radius at all but diametrically opposite portions 30. By use of the relieved control pin 29 one may readily compensate for extremes in tolerances in the original application of precision openings 23 and 23a in the plate 19 and effect a precise fit of the pin 29 in the related openings of the stacked plates. This last obtains a radial lock of the plates referenced to the master hole 23 in plate 19. It is noted that the other peripherally included openings in the die plates have tolerances enabling them to remain in general alignment and to retain their individual and intended function.

Thus, upon stacking the set of plates, pin 28 is pressed in place to be common to the several plates of the set and to perform a master control and a first alignment function. Secondary alignment is provided by the diamond pin 29 similarly installed in the precision formed aligned openings in the right hand rear corner of the plates. While the pin 29 may be round like pin 28 for matching engagement in the related holes, for proper lock this requires absolute precision formation and location of the noted holes. Therefore, it is in accord with a further concept of the invention that pin 29 is given the relieved cross-sectional shape as exemplified by the diamond-like configuration shown in FIG. 8. The combination of relieved pin 29 in a round hole permits lateral or radial easing, compensating for whatever slight lack of preciseness of correspondence there may be between the location of holes 23 and 23a of the several stacked plates. A substantially perfect alignment of the plates with one another and, correspondingly, of their working areas, is so provided with an absence of stress in the assembled relation of the plates.

Once the alignment and control pins are inserted there results a precisely fixed stacked assembly the plates of which may be clamped in the established position. Since the marked surface of plate 19 is uppermost, the stacked plates may all be bored in one pass to effect the required through passages for the desired tools and insure the precise alignment of their bearing parts. Once this has been achieved, the respective plates may be readily adapted to their use. In the case of the plate 19 counterbores may be effected in its upper surface to expand the tool passages to accommodate the heads of cutting tools such as the punches 40 here illustrated in FIG. 2 of the drawings. This provides that while the heads of the punches are contained within the limits of the plate 19 the bodies thereof project through and from the bottom of the plate, in a predetermined perpendicular orientation referenced thereto. Since the plate 22 was identically bored in a single pass, it provides passages for incorporating annular bearings which align directly with and provide bearing surfaces for the tools 40 which project therethrough. Similarly, having been drilled simultaneously with the plates 19 and 22, the plate 21 has openings adapted to precisely align with the punches 40. These last openings in the plate 21 may be counterbored at the undersurface thereof for press fit therein of die buttons 41 which accommodate the tips of the punches as they project through the stripper plate 22 and an underlying work piece.

The plate openings 26, 26' and 24, 24' are not only located peripherally in a manner to provide a large expanse of tooling area from end to end of the midportion of the plate but also to offer support to such area where it is needed the most. It has in the past been known to attach a die plate to its support by a rectangular arrangement of screws. This holds down various edge and corner portions of a plate but it does not adequately support the plate in its area of greatest stress, that is the tooling area in the center of the plate. It must be understood, moreover, that with a rectangular arrangement of hold-down screws, if any one is applied with a different stress than the others, there is produced a bending stress influencing the reference surface of the plate to define two different planes. In such event the mounted tools and interfitting parts will not have a coaxial alignment. The obvious consequence is inordinate wear of the working tools.

In contrast, particular note should be taken of the triangular or truss arrangement of related openings in the various invention plates of the present die assembly. For example, in the case of the plates 19 and 21 the openings 26 and 26' in one instance and 24 and 24' in the other provide hold-down locations for the die elements. It may be seen that such openings are triangularly located in a relatively symmetrical fashion so as to provide a lateral offset thereof from front to rear. Similarly, in the examples shown, triangularly arranged openings 24 and 24' position the attachment means for interrelating the stripper plate 22 to the plate 19 as will be further described.

To comprehend the preciseness and the rigidity of the mount of the plate 19, it must be understood that the triangular hold-down pattern affords shorter distance between attachment points and thereby increases plate strength and the rigidity of its mount. Moreover, by encompassing the tooling area by the truss arrangement of hold-down screws, one may more readily achieve a single precise reference plane from which the tools may commonly project in a sense perpendicular thereto. Thus, with a proper frame of reference for the die assembly, the tools and interfitting parts of the die plates will function with a minimal chance of interference and damage.

Referring once more to the assembly actually illustrated, the die shoe 10 is suitably bored to provide therein triangularly located openings 31 which, on application of the plate 19 to the shoe, dispose in vertical coaxial alignment with the openings 26 and 26'. The ends of the passages 31 remote from the plate 19 are each counterbored to accommodate the nesting therein of the head of a bolt 32 while the body thereof projects through the passage 31 and the aligned passage 26 or 26', as the case may be. The dependent threaded shank of each bolt 32 is threadedly engaged by a retainer nut 33 which fixedly nested inferiorly of the expanded lowermost extremity or counterbored portion of the related passage 26 or 26'. Accordingly, the plate 19 is clamped by the triangularly related bolts 32 and attached nuts 33 to achieve an extremely rigid mount thereof to the shoe 10.

In any event it has been found, as a practical matter, that with the use of a truss or triangular arrangement of holddown elements for the plate 19 one achieves an extremely rigid tooling area within the bounds thereof to a degree not heretofore available in use of the die plates of the prior art which feature rectangular arrangements of hold-down devices.

It will be obvious of course, that if the die shoe 10 is not previously bored, it may be quickly and readily marked and appropriately bored on application of the plate 19.

The plate 21 is similarly applied to the lower shoe 11. The latter is provided with triangularly positioned openings forming through passages 31' which on assembly position in vertical alignment with the passages 24 and 24' in the plate 21. In the case of the passages 31', they are expanded at the underside of the shoe 11 by counter-boring. In the example illustrated bolts 35 are inserted through the openings 24 and 24' in the plate 21 to nest their heads in the upper expanded extremities of the passages formed thereby and to have the bodies thereof project therethrough and through the aligned passages 31' in the shoe 11. The dependent extremities of the bolts 35 are threadedly engaged by fixed retainer nuts 35' which nest in the expanded portions of the passages 31' in a manner believed obvious. Here again one achieves a truss arrangement of the holddown bolts 35 which afford a most rigid mount of the die plate 21.

Referring again to FIG. 1 of the drawings, the openings 24 and 24' in the die plate 19 accommodate bolts 36 which have projecting threaded shanks. In the normal inoperative position of the die plate 19 the heads of the bolts 36 seat to a shoulder 25 or 25', as the case may be, in spaced relation to the adjacent back up surface of the die shoe 10. The shanks of the bolts 36 project through and from die plate 19 to and through the aligned apertures 24 and 24' in the stripper plate 22. The projected extremities of the bolts 36 terminate interiorly of the lower expanded counterbored portions of the passages 24 and 24' in the stripper plate where they are threadedly engaged by fixed, retainer nuts 38. Coil springs 37 dispose intermediately of the plate 19 and the stripper plate 22 in surrounding relation to each of the bolts 36. The springs 37 provide a normal bias on the plate 22 to dispose this plate normally in its maximum spaced relation to the plate 19 as limited and defined by the abutment of the heads of bolts 36 with the shoulders 25 and 25' in the passages 24 and 24'.

Referring to FIG. 2 of the drawings, the die assembly is there seen as embodying cutting elements in the form of the previously described punches 40 which elements have been activated to punch a sheet-like workpiece 42. It will be here observed that the openings formed in the tooling area of plates 21 and 22, which openings are coaxially aligned with a mounted punch element 40, respectively embody a die button 41 and a guide bushing 43. It should be understood referring to FIG. 9, the alignment and control pins 28 and 29 are used as shown in setting up the die assembly but are normally removed before the die is operated.

In use of the die assembly above described, the workpiece 42 is fed transversely of the assembly over the plate 21, between this plate and the normally elevated stripper plate 22. In operation thereof the upper shoe 10 reciprocates. It is induced to move in a timed relation to the movement of the workpiece. When the workpiece reaches and assumes its stationary or punch position of rest on the plate 21, the shoe 10 descends to carry therewith the plate 19, its attached tools 40 and, in advance thereof, the stripper plate 22. In the course of this descent the stripper plate 22 first contacts the workpiece, following which the die plate 19 moves down against the bias of the springs 37, relative the plate 22 and to the extent accommodated by the original displacement of the upper ends of the bolts 36 from the back up surface of the shoe 10. During this latter interval of travel the punches are caused to move downwardly through the stripper plate and the underlying workpiece and into the die buttons 41 in the die plate 21. The portion of the workpiece that is displaced is forced downwardly in the expanding passage 44 provided by the related die button 41 to clear its walls.

When the punching operation is completed, the die shoe 10 first moves the plate 19 upwardly relative the workpiece and the stripper plate 22, the latter of which is biased downwardly and held temporarily from a following motion by the energy previously stored in the springs 37. As the plate 19 continues upwardly from the workpiece, the heads of the bolts 36 will seat once more to the shoulders 25 and 25', in the process of which remaining energy in the springs 37 will cause the stripper plate 22 to move to strip the workpiece from the operating ends of the punches. Thereafter, the stripper plate and plate 19 are moved together to be repositioned by the shoe 10, ready for a subsequent punching operation.

Thus, the present invention provides that the respective elements of the die assembly may be basically contrived from a single versatile stock type plate. Further, due to the simple datum control and alignment means afforded by such plate which enable quick precision marking and boring thereof, a variety of die tools may be readily and economically effected in the use of the invention. Moreover a most precise accurately operating die assembly results the use of which minimizes both tool and wear and increases quality of production. Correspondingly the end products produced thereby have an optimal form.

Referring further to the novel details of the invention plate per se, it will be obvious that the linear disposition of the preformed critical apertures to the front and rear edges of a stock die plate insures a well defined tooling surface of optimal size. Further, it has been found in practice that the triangulated or truss pattern of the critical hold-down or suspension apertures establishes maximum strength and balance to the working area of the plates and attached tools. While, for example, three hold-down apertures have been illustrated as preferred, in some instances any odd number will serve the same purpose if offset from front to rear in the manner illustrated.

Considering the use of the datum control feature, the simple basic embodiment thereof here described serves a uniquely ultilitarian purpose facilitating a generally universally applicable die plate. This is so in the sense it enables a fast and accurate layout and an easy establishment of a required tooling pattern in the base plate. Further by placing the two control apertures at remote corners of the plate one achieves an economy of space and facilitates simultaneous machining of a plurality of plates for precision results.

The described use of selective counterboring is a further advantageous feature of the invention die plate. While not precluding tapping, where necessary, such use generally avoids the need for tapping operations and simplifies connection procedures. It also facilitates a variable use of a plate, lending it an ability to be variously turned or flipped to achieve a variety of orientations and results.

The invention thus affords a basic tool not heretofore available for use in the tool and die industry. The die plate is extremely flexible in application. One may merely stock a plurality of the same plates and due to the datum and alignment control apertures as afforded therein readily achieve, where the application so permits, a required die set. It produces a relatively stress free precision die structure to which work may be fed and formed with extremely precise and effective results.

As above described, in stacking the stock die plates such as 19 in an assembly for coboring or coreaming, the datum control pin 28 serves as a master or boss control pin, being inserted in the main through datum control apertures 23 in a precision slip-fit. On the other hand, the pin 29 functions in respect to the pin 28 as a slave element in achieving alignment control. The latter is enabled by the relief thereon to compensate for discrepancies in the alignment control openings in stacked plates as referenced to the datum control pin in the remote control openings in alignment therewith. Though there may be slight misalignment of the openings to receive the pin 29 caused by extremes in tolerances in precision forming thereof, due to its relief the pin 29 may nevertheless be slip-fit to achieve a radial lock of the plates referenced to the master pin and without inducing undesirable stress in the plates. Since the plates are not stressed in achieving a radial lock thereof, they will not be stressed during the machining thereof. One thereby avoids a possibly inherent misalignment of the respective related portions of the tooling areas of the plates once the pins are removed when the die assembly is ready for use. It is believed that the advantages thereof are quite obvious. It is important to particularly note that the concept of using the datum control pin 28 together with a relieved pin 29 promotes the feature of interchangeability of any one plate of a set with a corresponding stock die plate.

For example, if one of the die plates of an assembly is damaged, one can take a stock die plate to quickly prepare a substitute. In such instance, the new die plate can be stacked with the others of the set which are still in good condition, locked in radial adjustment using the datum control pin 28 and the slave pin 29, and clamped. Following this the new stock plate may be machined properly to incorporate therein the necessary key apertures with the plate remaining locked together by the control pins. Of course, additional contours may be formed in the stock die plate once the key apertures are established. Then when the assembly is replaced utilizing the substitute plate, it will function as originally intended. Thus, the invention eliminates the need for a replacement of an entire die assembly when one or more of the parts thereof should become damaged and unusable.

FIGS. 10 and 11 of the drawings show modifications of the control opening 23a which may be feasible and desirable for certain applications. FIG. 10 illustrates the stock die plate 45 similar to the plates 19, 21 and 22 which is provided with an opening 46 corresponding in position and function to the opening 23a. However, here the opening 46 is laterally elongated at its side remote from the datum control opening and to an extent that it opens through the adjacent end of the plate. As seen, the diamond shaped pin 47 is installed, in this case, in such elongated opening and through aligned openings therebelow. Such an arrangement where there are vertically stacked plates with openings 46 referenced to a master control pin inserted through the datum control openings, as previously described, enables a slip-fit of the pin 47 to obtain a lock of the plates referenced to the master control pin in a manner to obviate arcuate motion of the plates about the master pin as a pivot. It also provides for lateral compensation referenced to the master control pin, as may be necessary to avoid stress in a set of plates assembled for machining.

FIG. 11 illustrates a further modification of the alignment control opening. Here a stock die plate 48 comparable to the plate 19 has a laterally extended opening 49 for receiving a diamond pin 51. The opening 49 is similar to the opening 46 but is closed at both ends. The purpose and function of the opening 49 is the same as described in reference to the openings 23a in plate 19 and 46 in the plate 45.

As is obvious, the spirit and concept of the alignment control openings is essentially the same in the modifications of FIGS. 10 and 11 but provide for greater tolerances in referencing the slave pin to the master control pin as utilized in the case of the present invention.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. A die element a plurality of which forms a die assembly, comprising a stock die plate, said plate having formed therein a pattern of holes including two rows of spaced holes arranged in opposite lines respectively located in opposite peripheral edge portions of said plate, a first portion of said holes being arranged in a series successively positioned, in sequence, first in one then the other of said rows, successively offset from row to row, said holes of said series each having in one end thereof a counterbore, the counterbores of said series opening from a common surface of said plate to define a truss-like pattern for application of bolts or screws to nest the heads thereof or nuts applied thereto in said plate and to have the bodies thereof projected to selectively fix the plate to a die shoe or to suspend therefrom a stripper or like plate, and a second portion of said holes different from the first said portion arranged in a series similarly to the first said portion but in a reverse pattern, each of said holes in the reverse pattern having a counterbore in the end thereof which opens from a surface of said plate opposite that surface from which the first said counterbores open.

2. Apparatus as set forth in claim 1 characterized by said die plate providing means in association therewith for establishing a precise reference point for a plurality thereof in superposed relation and to relatively fix the superposed plates, each in relation to said reference point, to enable transfer or forming simultaneously in the plates, providing a die assembly, tool and die positions which will be precisely referenced in use.

3. Apparatus as set forth in claim 1 characterized by said stock plate having a datum control hole and a control passage formed therein spaced outwardly and generally in line with one of said rows to provide means for locking together the plural plates providing a die assembly, in superposed relation, providing the positions of the control passages of the respective plates are within permitted tolerances, for simultaneous transfer between or forming in said plates tool and die positions which will be precisely referenced in use of the assembly.

4. Apparatus as set forth in claim 1 characterized by each said stock die plate, a plurality of which forms a die assembly, additionally including in a peripheral portion thereof a datum control hole for establishing a precise reference for accurately locating holes and components to be machined in or attached to said plate and means defining a control passage spaced from said datum control hole and also located in a peripheral portion of said plate, said datum control hole and said control passage providing means for use in establishing a fixed relation of a plurality of said plates, to form a die assembly, in a superposed relation, the datum control holes of the plates as superposed accommodating means for common insertion therein to establish a common fixed point of reference on said plates and said control passages providing for application thereto of means to simultaneously lock the superposed plates in fixed relative positions referenced to the datum control holes thereof to enable a simultaneous machining of the superposed plates so that tools and related holes in the respective plates of a die assembly so provided will when installed be precisely related.

5. Apparatus as set forth in claim 1 characterized by said stock die plate having at least two further holes therein, respectively at remote portions of said plate, one of said holes being a master datum control hole and the other being a slave hole, said master and slave holes providing that when a plurality of said die plates are stacked to form a die assembly, a pin may be inserted through their master holes which are aligned and a fixed point of reference established thereby and a second pin-like device may be inserted through said slave holes, provided the latter are positioned and formed within tolerances, to accommodate means for fixing the plates of the assembly relative the point of reference defined at said master control holes, enabling thereby transfer between said plates of tool and die positions which will be precisely referenced in the assembly of the die.

6. Apparatus as set forth in claim 5 characterized by at least said first portion of said holes including at least three successive holes which are arranged in a triangular pattern, the base of the triangle disposing in one of said rows and the apex in the other, the counterbores of said three holes opening commonly from one surface of said plate which has a planar configuration.

7. Apparatus as set forth in claim 6 characterized by the second portion of said holes including at least three holes which are triangularly related, the pattern thereof being superposed and reversed in respect to the first said triangular pattern, the apex of the triangle defined thereby lying within the limits of the base of the first said triangular pattern and the base thereof disposing so the apex of the first triangular pattern lies therein, the counterbores of the holes of the second said triangular pattern opening to an opposite planar surface of said die plate.

8. Apparatus for providing a die assembly comprised of a plurality of die plates of essentially identical configuration, each plate being a stock plate a peripheral portion of which includes a datum control hole for establishing a precise reference for accurately locating holes and components to be machined in or attached to said plate and means defining a control passage spaced from said datum control hole and also located in a peripheral portion of said plate, said datum hole and said control passage providing means for use in establishing a fixed relation of the die plates in a superposed relation, pin means for insertion in the datum control holes in superposed plates for establishing a common fixed point of reference on said plates and further pin means for application to simultaneously bear in the means defining the control passages in the superposed plates, said further pin means having a configuration to accommodate discrepancies in the dimensions of the superposed control passages, within defined tolerances, and to establish contacts with portions of said plates defining said control passages to fixedly lock the superposed plates in a fixed position relative to the first said pin means to enable thereby an identical machining of the superposed plates so that tools and related holes in the respective plates of the die assembly will when installed be precisely related.

9. Apparatus as in claim 8 characterized by said further pin means having a form to produce thereon a pair of diametrically opposite essentially line contacts with portions of said plates defining said control passages, the form of said further pin means providing for its insertion as long as said control passages are within design tolerances as to position and orientation referenced to the datum control holes.

10. A die assembly as in claim 9 characterized by an assembly comprising at least two of said stock plates, said plates being formed so they may be interchangeably employed as either an upper or a lower die element of the die assembly.

11. Apparatus as set forth in claim 8 characterized by said stock plate having formed therein a plurality of other holes arranged in a triangulated pattern, remote portions of said pattern disposing respectively at opposite peripheral edge portions of said plate, each of said plurality of other holes having therein a counterbore opening from one surface of said plate to define a truss-like pattern for application therethrough of bolts or screws to nest the heads thereof or applied nuts in said plate and to project to selectively fix the plate to a die shoe or to suspend therefrom a stripper or like plate.

12. Apparatus as in claim 11 characterized by an additional plurality of holes in said stock plate arranged in a triangulated pattern which is reverse to the pattern of the first said plurality of holes, each of said additional plurality of holes having a counterbore opening from a surface of said plate opposite the surface from which said counterbores previously recited open, to provide for containment and projection therefrom of bolts or the like for establishing said plate in a connected relation to an opposite die shoe or to a stripper plate.

13. A die assembly consisting of a plurality of said stock plates as set forth in claim 1 wherein said stock plates may interchangeably position as an upper or lower die plate and each said first and second portion of said holes comprises three holes for balanced triangular fixing of a pair of said plates to opposite die shoes to present relatively unstressed planar surfaces outermost.

References Cited

UNITED STATES PATENTS

| | | | |
|---|---|---|---|
| 2,009,660 | 7/1935 | Irmus | 76—107X |
| 2,395,082 | 2/1946 | Wilson. | |
| 2,939,347 | 6/1960 | Tobey | 76—107 |
| 3,059,506 | 10/1962 | Linzell et al. | 76—107 |
| 3,062,083 | 11/1962 | Strnad | 76—107X |
| 3,194,090 | 7/1965 | Becker | 76—107 |

BERNARD STICKNEY, Primary Examiner

U.S. Cl. X.R.

29—465; 308—4